United States Patent

Lynn et al.

[11] Patent Number: 6,068,380
[45] Date of Patent: May 30, 2000

[54] MIRROR MOUNT HAVING AN INTEGRAL SPHERICAL BEARING

[75] Inventors: James D. Lynn, Fennville; John W. Carter, Holland; Daniel J. Bostwick, Grandville; James A. DeHaan, Zeeland; Wayne J. Rumsey, Holland; Dirk A. VandenBosch, Zeeland, all of Mich.

[73] Assignee: Gentex Corporation, Zeeland, Mich.

[21] Appl. No.: 09/251,971

[22] Filed: Feb. 17, 1999

Related U.S. Application Data

[63] Continuation-in-part of application No. 09/123,682, Jul. 28, 1998.

[51] Int. Cl.[7] .................................................. G02B 7/182
[52] U.S. Cl. ....................... 359/871; 359/872; 359/875; 359/876; 359/877
[58] Field of Search ..................... 359/871, 872, 359/875, 876, 877; 248/476, 479, 481, 484; 72/347, 379.2, 285, 286

[56] References Cited

U.S. PATENT DOCUMENTS

| 378,414 | 2/1888 | Burkhardt | 72/370.03 |
|---|---|---|---|
| 569,436 | 10/1896 | Spurr | 74/551.4 |
| 589,045 | 8/1897 | Temple | 74/551.4 |
| 857,616 | 6/1907 | Gault | 72/57 |
| 1,118,372 | 11/1914 | Shrum | 72/370.2 |
| 1,266,485 | 5/1918 | Kingston | 72/336 |
| 1,397,360 | 11/1921 | Carlson | 72/349 |
| 1,455,441 | 5/1923 | Hodny | 248/484 |
| 1,473,273 | 11/1923 | Zink | 248/481 |
| 1,513,769 | 11/1924 | Sullivan | 359/604 |
| 1,589,942 | 6/1926 | Condit | 72/370.12 |
| 1,590,227 | 6/1926 | Britton | 248/103 |
| 1,646,379 | 10/1927 | Whitehead | 248/481 |
| 1,663,254 | 3/1928 | Hufferd | 72/340 |
| 1,685,544 | 9/1928 | Hodny | 248/481 |
| 1,691,323 | 11/1928 | Zink | 359/855 |
| 1,700,524 | 1/1929 | Whitehead et al. | 248/481 |
| 1,719,169 | 7/1929 | Clulee | 72/370.04 |
| 1,961,895 | 6/1934 | Atwood | 248/480 |
| 2,113,488 | 4/1938 | Milton et al. | 472/4 |
| 2,141,753 | 12/1938 | Hufferd et al. | 403/76 |
| 2,227,817 | 1/1941 | Allen | 72/370.12 |
| 2,265,839 | 12/1941 | Hufferd et al. | 403/122 |
| 2,414,223 | 1/1947 | Virgilis | 359/606 |
| 2,526,045 | 10/1950 | Riemann | 403/56 |
| 2,652,221 | 9/1953 | Kampa | 248/276.1 |
| 2,688,297 | 9/1954 | Livermont et al. | 72/58 |
| 2,861,501 | 11/1958 | Strelakos | 359/802 |
| 3,036,366 | 5/1962 | Ricks | 29/898.052 |
| 3,104,897 | 9/1963 | Berger | 285/153.3 |
| 3,126,612 | 3/1964 | Poirier | 29/898.052 |
| 3,225,581 | 12/1965 | Hinderer | 72/370 |

(List continued on next page.)

*Primary Examiner*—Cassandra Spyrou
*Assistant Examiner*—Mohammad Y. Sikder
*Attorney, Agent, or Firm*—Price Heneveld Cooper DeWitt & Litton

[57] ABSTRACT

A mounting assembly for a vehicle interior rearview mirror of the automatic dimming type includes a vehicle mount having a rearwardly projecting first ball portion, a tube having a first end that receives the first ball portion and a second end including a rearwardly projecting second ball portion fixed with respect to the tube and having a wire hole therethrough, a ball clamp within the tube for engaging the first ball portion, a helical spring for biasing the ball clamp to a clamping relationship with the first ball portion, and a mirror socket for receiving and clamping the second ball portion. The tube of the mounting assembly and the first ball portion are unitary in one embodiment, while another embodiment has the tube and second ball portion provided with flanges that are biased into engagement with each other by the helical spring. The ball clamp has circumferentially spaced seat portions that seat the helical spring, clamping portions respectively aligned with the seat portions, and a wire conduit extending substantially to the hole in the second ball portion. In one embodiment, the tube is made from drawable quality material by a process using low-cost forming technology. The method of forming the tube is also disclosed.

12 Claims, 4 Drawing Sheets

U.S. PATENT DOCUMENTS

| | | | |
|---|---|---|---|
| 3,255,623 | 6/1966 | Ricks | 72/256 |
| 3,367,616 | 2/1968 | Bausch et al. | 72/256 |
| 3,376,633 | 4/1968 | Wesley | 248/483 |
| 3,449,937 | 6/1969 | Dimmig | 29/421.2 |
| 3,553,826 | 1/1971 | Abe | 72/318 |
| 3,594,026 | 7/1971 | Schmid | 403/51 |
| 3,644,973 | 2/1972 | Abe | 29/898 |
| 3,651,559 | 3/1972 | Lawlor | 29/422 |
| 3,740,986 | 6/1973 | Schmid | 72/84 |
| 3,759,205 | 9/1973 | Dolveck | 72/370.02 |
| 4,297,867 | 11/1981 | Masaki et al. | 72/347 |
| 4,382,572 | 5/1983 | Thompson | 248/484 |
| 4,470,287 | 9/1984 | Antonov et al. | 72/347 |
| 4,732,030 | 3/1988 | Tanaka | 72/356 |
| 5,020,218 | 6/1991 | Satrasser | 29/890.035 |
| 5,327,288 | 7/1994 | Wellington et al. | 359/606 |
| 5,487,294 | 1/1996 | Peterson | 72/370.03 |
| 5,572,354 | 11/1996 | Desmond et al. | 359/265 |

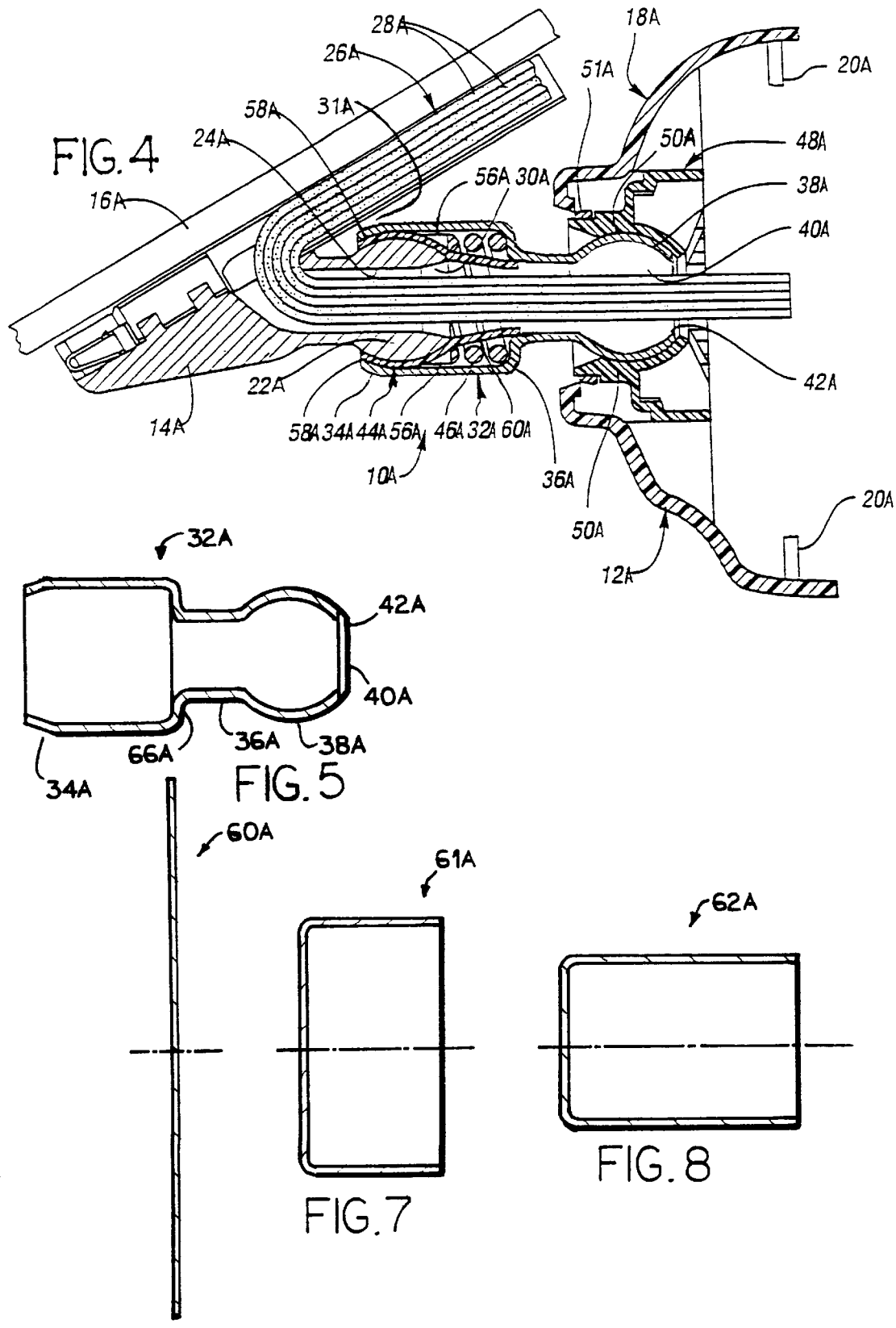

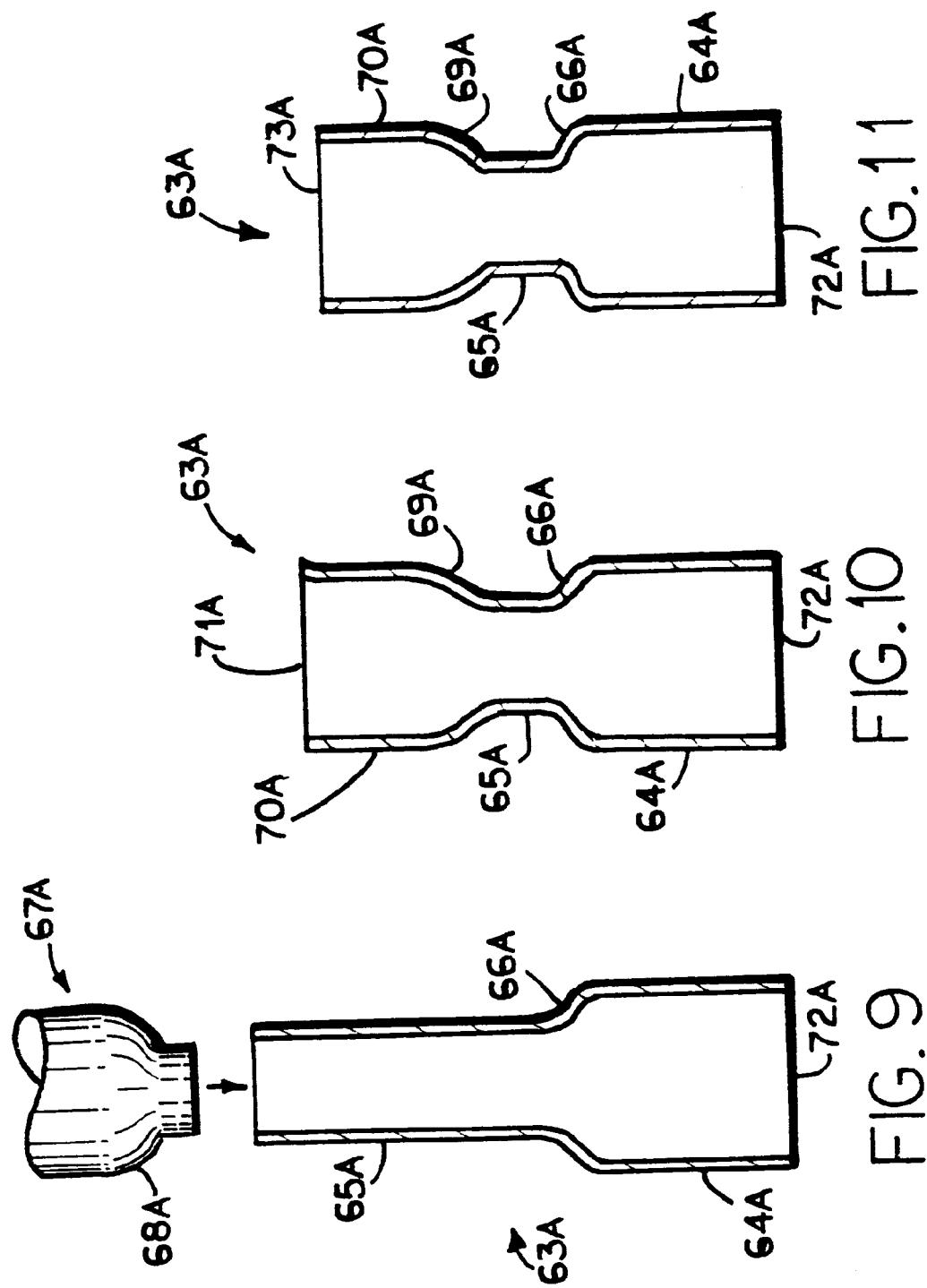

MIRROR MOUNT HAVING AN INTEGRAL SPHERICAL BEARING

CROSS REFERENCE TO RELATED APPLICATION

The present application is a continuation-in part of copending, co-assigned application Ser. No. 09/123,682, filed Jul. 28, 1998, entitled Mounting Assembly for Vehicular Interior Automatic Dimming Rearview Mirror.

BACKGROUND OF THE INVENTION

The present invention relates to a mounting assembly for mounting a vehicle interior rearview mirror to a vehicle mount. The present invention further relates to a high strength-to-weight part forming part of such mounting assembly, and methods of forming same.

For the last 30 years or so, one common mounting assembly for vehicle interior rearview mirrors has been a tubular dual ball-and-spring support construction, such as disclosed by U.S. Pat. No. 3,367,616 to Bousch et al. With that construction, a spring biases vehicle-mounted and mirror-mounted balls into engagement with opposite ends of a tube. The mirror can be adjusted by rotation of each of the two balls, though it is usually desirable to adjust the mirror at the mirror-mounted ball. However, the same spring biases both balls and as such both will rotate at the same level of force unless there are different clamp members or ball clamp members of the same construction but made of materials having different coefficients of friction. Other dual ball mounts of this type are disclosed by U.S. Pat. No. 4,646,210 to Skogler et al., U.S. Pat. No. 5,327,288 to Wellington et al., and U.S. Pat. No. 5,521,760 to DeYoung et al. It is sometimes desirable to provide different levels of force at the opposing ends of a mirror mount to facilitate adjustment by a vehicle driver.

Vehicle interior rearview mirrors of the automatic dimming type are conventionally about twice as heavy as standard rearview mirrors. For this reason, it is desirable for the mirror-mounted ball to be located relatively close to the center of gravity of the mirror in order to minimize the torsional effect of the mirror weight on the ball and to facilitate adjustment of the mirror. An improvement is desired that facilitates positioning the ball close to the center of gravity of the mirror, yet that maintains the low cost and durability of the mounting assembly.

Modern interior rearview mirrors of vehicles are commonly mounted to a vehicle front window or to an overhead console. However, in such a position, the mirror-mounting assemblies are subject to conflicting design criteria. For example, it is desirable to construct mounting assemblies having a minimized length, so that the mirror is not adversely affected by vibrational problems associated with long cantilevered support arms. At the same time, the mounting assemblies must be long enough to permit adequate angular adjustment of the mirror without interference from the vehicle front window or overhead console, and further must be long enough to allow quick assembly, mechanically as well as electrically.

Another objective is to minimize weight of the mounting assembly. Low weight is an important objective of modern vehicle manufacturers, because it helps manufacturers meet curb weight and fuel mileage goals, which items are due in part to customer demand and also due in part to government incentives to manufacture vehicles that achieve high fuel mileage and have a low curb weight. Nonetheless, even low-weight mounting assemblies must maintain sufficient rigidity and stiffness to prevent unacceptable amounts of mirror vibration, and further must be able to provide the long term durability necessary to allow thousands of angular adjustments as different vehicle drivers adjust the mirror for their individual use.

As noted above, known mounting assemblies of interior rearview mirrors typically include one or more ball-and-socket type connections. It is important that each of the ball-and-socket connections permit easy angular adjustment, so that all drivers, even those who have relatively weaker arms and wrists, can adjust the mirror to an optimal angular position. At the same time, the ball-and-socket connections must securely hold the newly selected angular positions, once they have been adjusted. Accordingly, it is very important that the torsional frictional forces on the ball-and-socket connections set by design goals are consistently met with low product variation. It is also important that the ball-and-socket connections maintain the designed torsional frictional forces over their life and over a wide range of temperature variation while the vehicle is in service. Still further, it is preferable that the feel provided during any adjustment movement be very uniform and smooth, because vehicle drivers interpret this as an indication of the quality of the mirror, as well as of the quality of the vehicle as a whole.

Accordingly, a mounting assembly solving the aforementioned problems and having the aforementioned advantages is desired, which mounting assembly preferably is compact and maintains maximum adjustability, while minimizing its effective length and weight, and that is mechanically simple and utilizes low cost parts and manufacturing processes.

SUMMARY OF INVENTION

In one aspect of the present invention, a vehicle mirror construction includes a one-piece elongated tubular member having a sleeve portion at one end, an integrally formed first ball portion at an opposite end, and a hole extending longitudinally through the tubular member from the one end to the opposite end. The construction further includes a mirror housing including a socket portion operably engaging the first ball portion to define a first ball-and-socket connection, and a vehicle mount including a second ball portion, with the one end receiving the second ball portion and the sleeve portion including an inwardly deformed end flange operably retaining the second ball portion therein to define a second ball-and-socket connection.

In another aspect of the present invention, an adjustable mount includes a one-piece, elongated, structural, tubular member formed from flowable contiguous material forming a sleeve portion at one end and an integrally connected ball portion at an opposite end. The sleeve portion and the ball portion include inner surfaces defining a continuous passageway through the tubular member from the one end to the opposite end. The adjustable mount further includes a mating member having a socket portion that operably frictionally engages the ball portion to form a ball-and-socket joint. In a narrower aspect, the tubular member is made from drawable material and has a substantially constant wall thickness throughout its length.

In another aspect of the present invention, a bearing includes a deep-drawn spherical section made from draw-quality material that has a substantially constant thickness wall and an accurately formed outer surface that closely approximates a true sphere, preferably within 0.1 mm. The spherical section characteristically includes drawn and worked material, but characteristically does not include any discontinuous material, abutting edges, or welded material.

The drawn and worked material has marginal material forming holes on opposite sides of a center point of the spherical section for routing utilities therethrough.

In yet another aspect of the present invention, a process includes steps of deep drawing a flat blank into a structural tubular shape having a sleeve portion, forming a first semi-spherical shape near an end of the sleeve portion with an open side of the first semi-spherical shape facing away from the sleeve portion, and forming a mating semi-spherical shape on the end that has an open side mating with the first semi-spherical shape to form a ball portion at an end of the sleeve portion.

In still another aspect of the present invention, a structural mount having sufficient physical strength to support a cantilevered weight includes a tubular member made of draw-quality sheet material including a sleeve section having a first diameter that defines a longitudinal axis, a ball section having a center point on the longitudinal axis, and a connector section with a second diameter that connects the tube section to the ball section. The ball section is subdivided into opposing concave rings by a transverse plane containing the center point and extending perpendicular to the centerline. The opposing concave rings are adjacent the plane and extend parallel the plane, with a largest diameter being adjacent the plane and smaller diameters spaced from the plane. The tubular member has a constant wall thickness through the ball section. The connector section, the sleeve section, and the ball section are characteristically work hardened during their formation, and the ball section is durable and accurately formed to within about 0.1 mm of a true sphere.

These and other aspects, objects, and advantages of the present invention will be understood and appreciated by those skilled in the art by reference to the present specification, claims, and appended drawings.

BRIEF DESCRIPTION OF DRAWINGS

FIG. 4 is a cross-sectional view similar to FIG. 1, but including a modified tube;

FIG. 5 is a cross-sectional view of the modified tube shown in FIG. 4; and

FIGS. 6–12 are cross-sectional views showing the forming of a flat blank into the modified tube of FIG. 4, FIGS. 9 and 12 showing die tools assisting in the forming process.

DETAILED DESCRIPTION OF PREFERRED EMBODIMENTS

Figure 1:
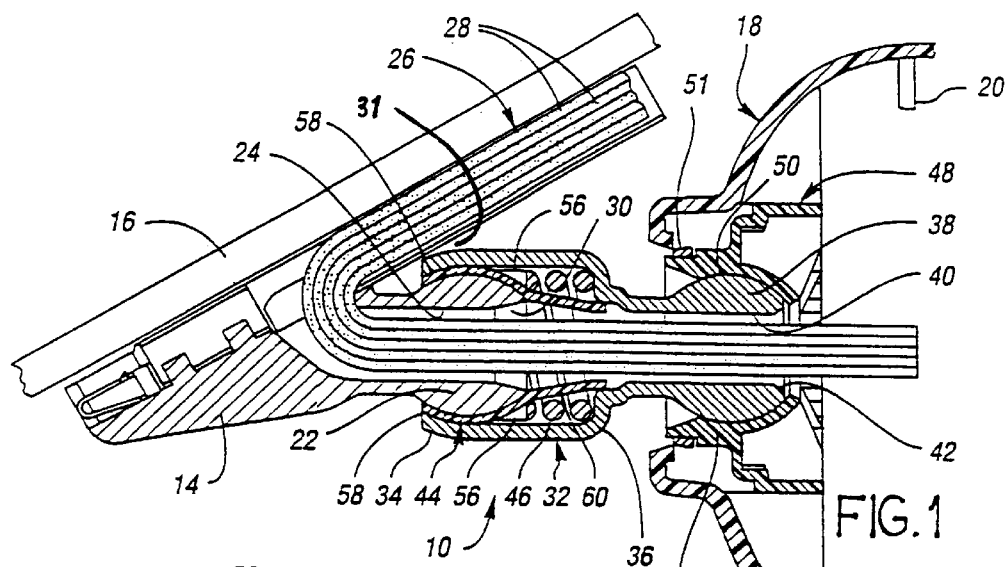
FIG. 1 is a cross-sectional view taken through a mounting assembly embodying the present invention.

With reference to FIG. 1, a mounting assembly generally indicated by 10 is constructed in accordance with the present invention to provide mounting of a vehicle interior rearview mirror 12 of the automatic dimming type that is electrically powered and may also support accessory apparatus that is electrically powered and/or operated. The mounting assembly 10 includes a vehicle mount 14 of any conventional type that is constructed to be mounted on a vehicle such as on the windshield 16 whose interior surfaces faces downwardly and to the right as illustrated. The automatic dimming mirror 12 supported by the mounting assembly 10 includes a housing 18 that supports an automatic dimming mirror element 20 facing rearwardly toward the right.

As illustrated in FIG. 1, the vehicle mount 14 has a rearwardly projecting first ball portion 22 that has a wire hole 24 therethrough for receiving a wire bundle 26 including a plurality of wires 28 that power the mirror 12 and also power and/or control any accessory components. At the rear right extremity of the first ball portion 22, the wire hole 24 has an outwardly flared end 30 to accommodate for the wire bundle 26 upon rotatable adjustment of the mounting assembly 10 at the first ball portion 22 as is hereinafter more fully described.

Mounting assembly 10 (FIG. 1) has a tube or tubular member 32 that includes a first end 34 that receives the first ball portion 22 and is curved inwardly to provide a clamping relationship as is hereinafter more fully described. The tube 32 also has a second end 36 with a rearwardly projecting second ball portion 38 formed thereon that is fixed with respect to the tube 32 and that has a wire hole 40 therethrough for accommodating the wire bundle 26. At the right rear extremity of the second ball portion 38, the hole 40 has an outwardly flared shape 42 that accommodates the wire bundle 26 upon adjustment of the mounting assembly 10 about the second ball portion 38 as is hereinafter more fully described.

Figure 3:
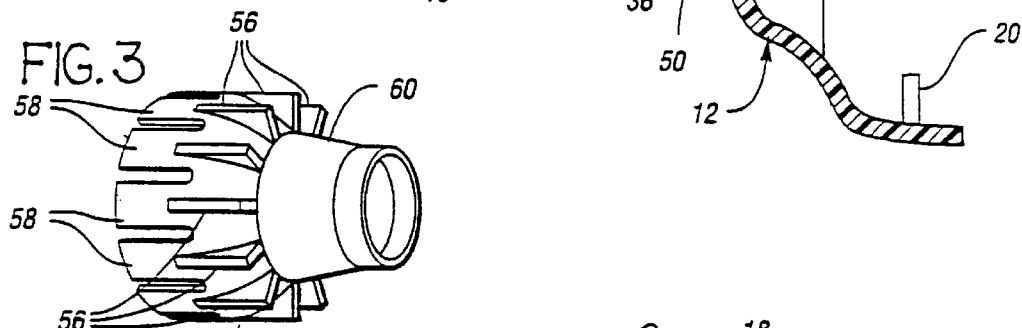
FIG. 3 is a perspective view illustrating the ball clamp shown in FIG. 1.

With reference to FIGS. 1 and 3, the mounting assembly 10 includes a ball clamp 44 received within the tube 32 and engaging the first ball portion 22. A helical spring 46 is seated by the second tube end 36 and is also seated against the ball clamp 44 to provide a clamping relationship with the first ball portion 22. A mirror socket 48 is mounted in any suitable manner by the mirror housing 18 and has socket portions 50 for receiving and clamping the second ball portion 38 with a metal clamp ring 51 extending around the socket portions to provide a resilient clamping relationship.

Adjustment of the mounting assembly 10 can take place at either the first ball portion 22 or the second ball portion 38. At the first ball portion 22, the adjustment takes place about the vehicle mount 14 and the force required to provide adjustment is controlled by the biasing of the spring 46 and the friction between the ball clamp 44 and the first ball portion 22. Furthermore, adjustment of the mirror 12 takes place about the second ball portion 38 with the force required to overcome the positioning controlled by the clamp ring 51 and the coefficient of friction between the second ball portion 38 and the socket portions 50.

With continuing reference to FIG. 1, it will be noted that the tube 32 and the second ball portion 38 are constructed unitary with each other in this embodiment. Thus, the fixed relationship of the second ball portion 38 with respect to the tube 32 is provided by this unitary construction with the wire bundle 26 extending through the hole 40 in the second ball portion 38 as well as through the hole 24 in the first ball portion 22 to provide the mirror dimming operation and the control of any electric accessory components.

Figure 2:
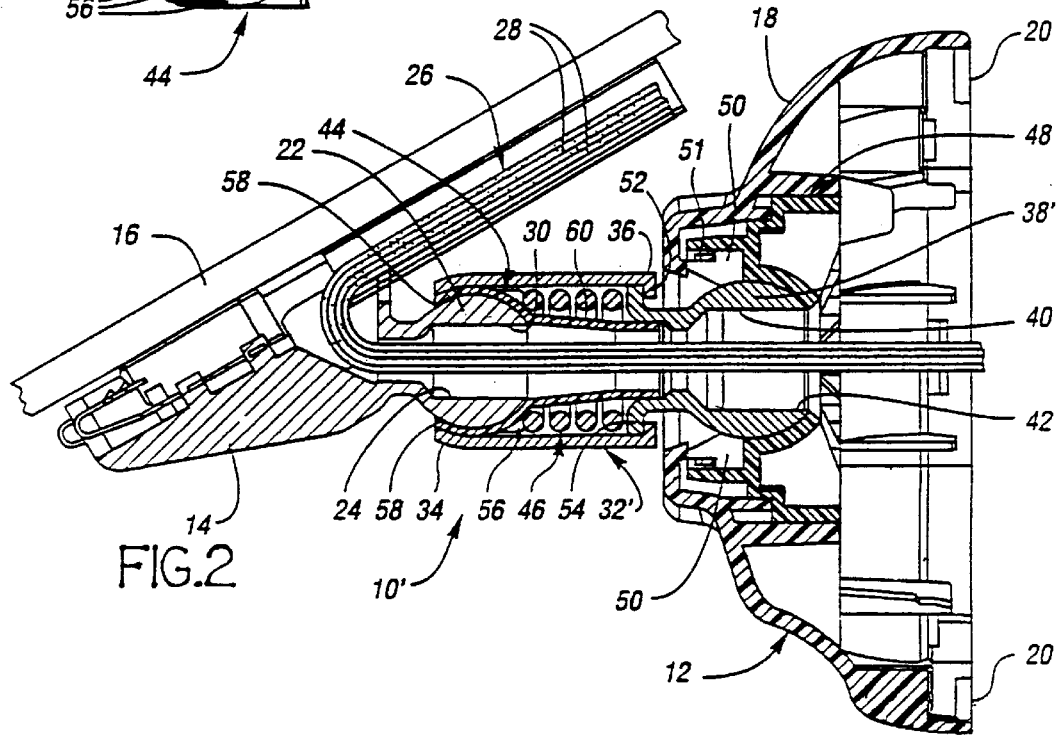
FIG. 2 is a cross-sectional view similar to FIG. 1, but illustrating another embodiment.
Figure 12:
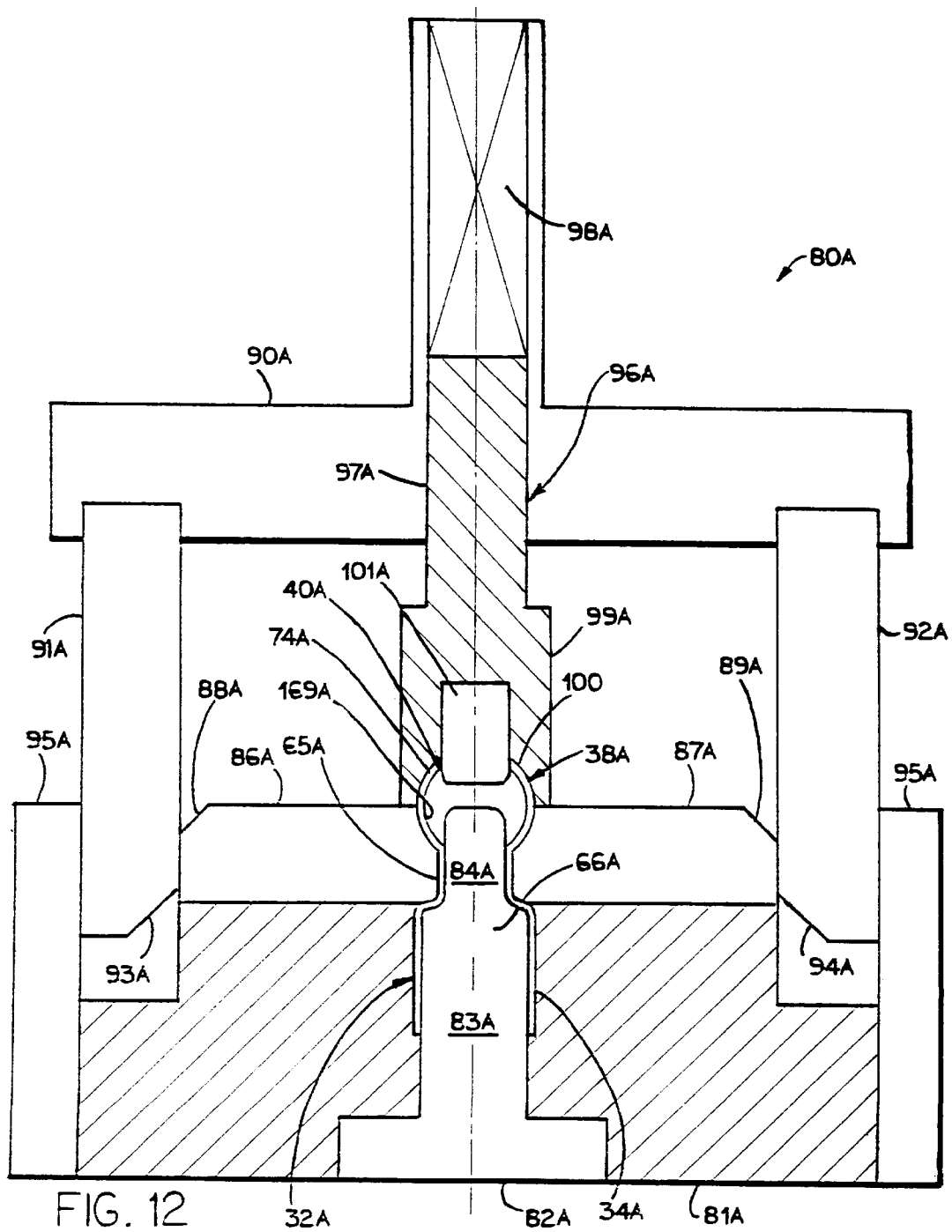

With reference to FIG. 2, another embodiment 10' of the mounting assembly has the same construction as the previously described embodiment except as will be noted, such that its components are identified by like reference numerals and much of the previous description is applicable and need not be repeated. However, the embodiment 10' of the mounting assembly has its tube 32' and second ball portion 38' constructed as separate components instead of being unitary as in the previously described embodiment. Further, the tube 32' has an annular flange 52 and the second ball portion 38' has an annular flange 54, and these flanges 52/54 are biased into engagement with each other by the rear end of the helical spring 46 so as to provide the fixed relationship between the second ball portion 38' and the tube 32'.

The ball clamp 44 illustrated in FIG. 3 is utilized with both of the embodiments of the mounting assembly 10 and 10' respectively illustrated in FIGS. 1 and 2 and is preferably injection molded from a suitable plastic such as acetal. More specifically, the ball clamp 44 has a plurality of circumferentially spaced seat portions 56 that cooperatively seat the adjacent end of the helical spring 46 in the assembled condition. This construction allows the ball clamp 44 to fully engage the rear extremity of the first ball portion 22 adjacent the seat portions 56 to provide a stronger clamped condition than prior clamp members that do not fully engage the ball portion. Furthermore, the ball clamp 44 has a plurality of circumferentially spaced clamping portions 58 respectively aligned with the seat portions 56 and extending forwardly around the first ball portion 22 adjacent the inwardly curved first end 34 of the tube. Thus, upon assembly, the clamping portions 58 move toward each other as they assume the inward curvature of the ball extending forwardly past its full diameter. By varying the materials or surface finishes of the ball portions and the socket portions, and/or by varying the force of spring 46 or the force of clamp ring 51, the torsional frictional forces at the two ball-and-socket connections can be closely controlled. For example, the torsional frictional resistance of the ball-and-socket connection at the window is typically designed to be greater than the torsional frictional strength of the ball-and-socket connection at the mirror.

With continuing reference to FIG. 3 and reference also to the embodiments of FIGS. 1 and 2, the ball clamp 44 also has a wire conduit 60 that extends substantially to the hole 40 in the second ball portion 38 with the wire bundle 26 extending therethrough between the ball portions.

It is contemplated that the tube 32 and the tube-and-ball subassembly 32'/38' discussed above can be constructed in many different ways and through use of different processes, and it is contemplated that the present invention includes all such tube and subassembly constructions. Consistent with the discussion in the background above, it is important that the physical properties of the tube be optimized, and yet it is also important that the cost, dimensions, and weight of the tube be minimized. The tube 32 (FIG. 1) accomplishes such requirements through die-cast material that is flowed into the shape of the one-piece tube 32, including the shape of the sleeve portion formed by tube ends 34/36 and including the shape of the second ball portion 38. The process of die casting and of formulating die-cast materials is well-known in the art, and therefore it need not be discussed herein for an understanding of that aspect of the present invention. Specifically, it is contemplated that the dimensions and material composition of die-cast tube 32 can be optimized using different die-casting materials having different properties, and/or by optimizing the die-casting process (e.g., by using optimally controlled die-casting practices to minimize stress and optimize dimensional accuracy). It is further contemplated that the wire hole 40 in the second ball portion 38 and the wire hole 24 in the tube ends 34/36 can be formed in the raw die-cast part, or can be drilled or machined therein after die casting. Preferably, the wire holes 24/40 will be formed in the tube 32 as cast, such that secondary processing is minimized. An important property is the accuracy of the spherical shape of second ball portion 38, since this relates to the feel given to a vehicle driver when the driver angularly adjusts the mounting assembly 10, and further an important feature is the lack of burrs or sharp edges, since wires are extended through the wire hole 40. Further, the accuracy, stiffness, and surface quality of the second ball portion 38 correlates to the strength of the mounting assembly 10 and to its ability to stably but adjustably hold a particular selected angular position. It is noted that the mirror socket portions 50 have a clamp ring 51 that extends around the socket portions 50 to provide a resilient clamping relationship that helps provide this continuous, consistent, known clamping force, even where there are inconsistencies in the outer surface of the ball portion.

In one aspect, it is contemplated that the one-piece tube 32 could be molded of plastic, such as by using glass-fiber-reinforced moldable materials or other mineral-filled moldable materials. Compression molding and/or injection molding are examples of processes that could be used to mold and form such moldable materials. The subassembly of tube 32' and second ball portion 38' illustrates a design where the tube 32' and the second ball portion 38' can be made from different materials. The illustrated second ball portion 38' is made of die-cast material, while the tube 32' can be made from other material, such as non-die-cast tubing. It is contemplated that different material combinations could also be used. For example, polymeric material could be used for the second ball portion 38' with metal being used for the tube 32'.

The mounting assembly 10A (FIG. 4) utilizes a particularly lightweight, high strength, and low cost tube 32A that provides surprising and unexpected properties in terms of its strength-to-weight ratio and its dimensional accuracy. In mounting assembly 10A, components and features that are similar to or identical with components and features in mounting assembly 10 are identified by using identical numbers, but with the addition of the letter "A." This is done to reduce redundant discussion, and so that various related aspects of the present invention are easier to understand. Initially, it is noted that the tube 32A, when manufactured with the process illustrated below, is particularly and surprisingly dimensionally accurate.

The illustrated tube 32A is preferably made from deep-drawable material, such as aluminum 3003, draw quality. Deep-drawable steels and other metals can also be used, but this aluminum has the quality of being particularly lightweight and of providing a high strength-to-weight ratio. The wall thickness of the illustrated tube 32A is about 0.7 mm to 1.0 mm, but it is noted that the optimal thickness required depends on the functional requirements of the particular mounting assembly design under consideration, including the dimensions of the tube 32A and the weight of the mirror 12. The illustrated tube 32A is about 53 mm long and the second ball portion 38A has an outer diameter of about 22 mm, accurate to within about 0.003 inches or about 0.1 mm of a true sphere. The large diameter end 34A has a similar diameter. It is contemplated that the accuracy of an outer surface of the second ball portion 38A can be maintained at about 0.001 inches or about 0.03 mm where raw materials for forming the tube 32A are properly controlled, and/or where the tube 32A is re-struck at critical steps, and/or where the dies are sufficiently closely toleranced and controlled. Notably, the wall thickness of tube 32A is about half or less than that of the die-cast tube 32 and also aluminum is lighter weight, thus leading to a significantly lower part weight. Further, the second ball portion 38A has significantly less volume of material than second ball portion 38, thus also leading to a lower weight. Advantageously, the thinner dimension of the wall contributes directly to an increased range of angular adjustment of the mirror 12. This can best be seen by comparing the clearance 31 above the mounting assembly adjacent the vehicle mount between the end 34 of the tube 32 to the vehicle mount 14 (FIG. 1), and the larger clearance 31A above the end 34A of the tube 32A to the vehicle mount 14A (FIG. 4). Another advantage to the invention is the ductile nature of the material, which can enhance occupant safety in a vehicle crash.

For reference, it is noted that the sleeve portion 32A defines a longitudinal centerline and the second ball portion 38A defines a center point on that centerline. A transverse plane containing the center point extends perpendicular to the centerline and divides the second ball portion 38A into circular ring shapes adjacent the transverse plane, each of which extends parallel the plane. The circular ring shapes have a largest diameter adjacent the plane and smaller diameters spaced from the transverse plane.

It is contemplated that an exceptionally strong and accurate bearing can be made from the deep-drawn spherical section (i.e., second ball portion 38A). Wire holes formed on opposite sides of a center point of the second ball portion 38A are useful for routing utilities through such a bearing, but without degrading the structural integrity of the bearing. The tube ends 34A/36A extend from the second ball portion 38A to form a stiff structural stem or sleeve for attachment. It is specifically contemplated that the present tubular member 32A can be used in many applications outside of the mirror art, where a strong, lightweight, accurate ball-and-socket joint must be formed, such as in the aircraft, aerospace, and military industries.

The deep-drawn tube 32A and its forming process are considered to be novel, useful, and non-obvious, particularly due to its surprising and unexpected benefits of very lightweight (including very thin wall thickness), high strength-to-weight ratio, and low cost. In particular, the tube 32A benefits from being a low-cost draw-formed shape with radial symmetry and with very thin wall thickness, yet it is made by using industry-available draw-forming machinery and materials. The forming and working of the material forming the second ball section 38A results in highly accurate, repeatable, and structurally work-hardened walls in the second ball portion 38A. This has significant benefits when used in a mechanical ball-and-socket joint where the ball portion is made relatively thinner and lighter in weight, but also has benefits where the ball-and-socket joint is made relatively thicker and exceptionally strong.

The process of forming deep-drawn tube 32A is shown in FIGS. 6–12. Notably, it is contemplated that the present invention is broad enough to include making tube 32A from seamless tubing or from welded roll-formed tubing or piping. It is also contemplated that the present invention is broad enough to include a tube made from sheet stamped into a tubular closed shape that is welded together. Nonetheless, the illustrated process is preferred since stresses are uniformly distributed and there are minimal surface irregularities and minimal irregularities and non-uniformities in its walls caused by welding or unbalanced forming processes.

The present inventive process includes forming a flat blank 60A (FIG. 6), preferably circular, and drawing the blank 60A into deeper and deeper cup shapes 61A (FIG. 7) and 62A (FIG. 8). After several steps, a tubular member 63A (FIG. 9) is formed with a first sleeve portion 64A having a larger diameter and a second sleeve portion 65A having a smaller diameter, with a transversely oriented ring-shaped shelf or ledge 66A being formed connecting the two sleeve portions 64A/65A. A punch-like die member 67A (FIG. 9) having a semi-spherically shaped surface 68A is brought into the smaller diameter sleeve portion 65A to expand the diameter and to form a semi-spherical section 69A (FIG. 10) near a midsection of the tubular member 63A. A relatively short cylindrically shaped sleeve portion 70A temporarily extends from the semi-spherical section 69A toward the end 71A of the tubular member 63A that is opposite end 64A. Either immediately before, during, or immediately after the step of forming the semi-spherical section 69A, a bottom punch-like die member (not specifically shown in FIG. 10, but see pin 82A, FIG. 12) is brought up into a bottom of the larger diameter sleeve portion 64A, and further the outer surface of the sleeve portions 64A/65A are supported, such that the "hour-glass" shape of the sleeve portions 64A/65A and the shape of the ring-shaped shelf 66A are very accurately formed. During this process, the terminal edges 72A/73A (FIG. 11) of the tubular member 63A are trimmed so that the lengths of the sleeve portions 64A/65A/70A and the overall length of tubular member 63A are very accurate. As illustrated, the terminal edge 72A of sleeve portion 64A is trimmed first (see FIG. 9) before the enlarging step for forming the semi-spherical shape 69A. The terminal edge 73A is trimmed after the enlarging step forming the semi-spherical shape 69A. This allows the correct amount of material to remain in the short sleeve portion 70A. In a near final or final step of the drawing process (FIG. 12), the outboard or end half 74A of the second ball portion 38A is formed, as described below. Thereafter, the tube 32A is deburred, buffed, coated, or otherwise treated for optimizing its use, depending on the functional requirements of the use.

The die apparatus 80A (FIG. 12) and the method that it incorporates are believed to be advantageous to the low cost and high accuracy of the resulting tubular member 63A. The die apparatus 80A includes a base plate 81A supported on a stationary platen. The base plate 81A supports a punch-like multi-diameter pin 82A. The pin 82A includes a larger diameter section 83A for closely supporting the larger diameter sleeve portion 64A, a smaller diameter protruding tip 84A for closely supporting the smaller diameter sleeve portion 65A, and a ring surface 85A adapted to closely support the ring-shaped shelf 66A. A pair of transversely shiftable slides 86A/87A are slidably supported on the base plate 81A, and include inner opposing surfaces shaped to closely engage and support the smaller diameter sleeve portion 65A and to support the semi-spherical shape 69A when in an inwardly cammed position. The slides 86A/87A include angled camming surfaces 88A/89A at their outer top edges. A top die plate 90A is attached to a moveable platen on a stamping press. A pair of camming arms 91A/92A extend downwardly from the top die plate 90A and include mating camming surfaces or rollers 93A/94A located to mateably engage the camming surfaces 88A/89A, respectively, to drive slides 88A/89A inwardly when the top die plate 90A is lowered. The slides 86A/87A are spring biased outwardly so that they naturally return to a disengaged position when the top die plate 90A is raised. Alternatively, they can be mechanically returned to the disengaged position when the top plate 90A is raised. The base plate 81A includes backer supports 95A that support the ends of the camming arms 91A/92A when they engage the slides 88A/89A, so that the slides 88A/89A are accurately moved and so that the camming arms 91A/92A do not deform or break during the forming process.

An elongated forming tool 96A (FIG. 12) includes a tail end section 97A telescopingly supported on the top die plate 90A and that is spring biased downwardly by a spring 98A. The lower end 99A of the tool 96A includes a downwardly facing, semi-spherically shaped recess 100A, and a centering pin 101A that extends into the recess 100A of tubular member 63A. Tubular member 63A (with semi-spherical portion 69A) (see FIG. 11) is positioned in the base plate 81A on pin 82A. When the top die plate 90A is lowered, the camming arms 91A/92A drive the slides 88A/89A inwardly to fully support a middle section of the tubular member 63A. As the top die plate 90A is further lowered, centering pin 101A extends into the wire hole 40A of the second ball portion 38A, and the angled surfaces of the semi-spherical recess 100A engage the outer end of the short cylindrical sleeve portion 70A, forming it inwardly into a spherical shape. This forms the "top half" or outboard portion of the second ball portion 38A. Due to the fact that the material of the tubular member 63A is closely captured and drawable and also since it is uniformly stressed, and due to the fact that the spherical shape is "self-reinforcing," the material is very accurately and repeatedly formed. Also, the material of the second ball portion 38A is work hardened, such that it is particularly strong and durable.

Accordingly, a tubular member is disclosed that can be advantageously used in any ball-and-socket connection where an accurate ball portion is desired, and where low cost and lightweight are important. The tube 32A is particularly advantageous to use where a very high strength-to-weight ratio is desired, and where electrical or other utilities must be communicated through an adjustable ball-and-socket joint to a relatively heavy component, such as an electrochromic mirror, particularly where the heavy component must be supported in cantilever by the tubular member 63A. However, it is contemplated that the present tube 32A can be used and will be useful in non-EC mirror applications.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A vehicle mirror construction comprising:
   a one-piece elongated tubular member having a sleeve portion at one end, an integrally formed first ball portion at an opposite end, and a hole extending longitudinally through the tubular member from the one end to the opposite end, the tubular member being made of contiguous flowable material, wherein the contiguous, flowable material comprises one of die-cast material and draw-quality material;
   a mirror housing including a socket portion operably engaging the first ball portion to define a first ball-and-socket connection; and
   a vehicle mount including a second ball portion, the one end receiving the second ball portion and the sleeve portion including an inwardly deformed end flange operably retaining the second ball portion therein to define a second ball-and-socket connection.

2. The mirror construction defined in claim 1, wherein the flowable material comprises kiln draw-quality material.

3. The mirror construction defined in claim 2, wherein the flowable material is work hardened in that part forming the first ball portion and the sleeve portion.

4. The mirror construction defined in claim 3, wherein the tubular member has a substantially constant wall thickness that extends from the sleeve portion to and including the ball portion.

5. The mirror construction defined in claim 4, wherein the sleeve portion includes first and second diameter sleeve sections.

6. The mirror construction defined in claim 5, wherein the tubular member includes a ledge formed between the first and second diameter sleeve sections, and including a spring engaging the ledge.

7. The mirror construction defined in claim 6, wherein an outer surface of first ball portion is within 0.003 inches of true spherical shape.

8. The mirror construction defined in claim 1, wherein the tubular member has a substantially constant wall thickness that extends from the sleeve portion to and including the first ball portion.

9. The mirror construction defined in claim 8, wherein the wall thickness is within a range of about 0.7 to 1.0 mm.

10. The mirror construction defined in claim 1, including a ball clamp inside of the tubular member and substantially surrounding the second ball portion, and a resilient member which urges the ball clamp into contact with the second ball portion to generate friction thereon.

11. The mirror construction defined in claim 10, wherein the resilient member comprises a helical spring.

12. A vehicle mirror construction comprising:
    a one-piece elongated tubular member having a sleeve portion at one end, an integrally formed first ball portion at an opposite end, and a hole extending longitudinally through the tubular member from the one end to the opposite end;
    a mirror housing including a socket portion operably engaging the first ball portion to define a first ball-and-socket connection; and
    a vehicle mount including a second ball portion, the one end receiving the second ball portion and the sleeve portion including an inwardly deformed end flange operably retaining the second ball portion therein to define a second ball-and-socket connection;
    a ball clamp inside of the tubular member and substantially surrounding the second ball portion, and a resilient member comprising a helical spring which urges the ball clamp into contact with the second ball portion to generate friction thereon;
    a second tubular member within the helical spring, and including wiring extended through the second tubular member from the vehicle mount to the mirror housing.

* * * * *